(12) United States Patent
Pusdesris et al.

(10) Patent No.: US 11,983,533 B2
(45) Date of Patent: May 14, 2024

(54) CONTROL FLOW PREDICTION USING POINTERS

(71) Applicant: Arm Limited, Cambridge (GB)

(72) Inventors: Joseph Michael Pusdesris, Austin, TX (US); Alexander Cole Shulyak, Austin, TX (US); Yasuo Ishii, Austin, TX (US); Houdhaifa Bouzguarrou, Valbonne (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/851,266

(22) Filed: Jun. 28, 2022

(65) Prior Publication Data

US 2023/0418609 A1     Dec. 28, 2023

(51) Int. Cl.
*G06F 9/30*     (2018.01)
*G06F 9/38*     (2018.01)

(52) U.S. Cl.
CPC ........ *G06F 9/30058* (2013.01); *G06F 9/3861* (2013.01)

(58) Field of Classification Search
CPC .................................................. G06F 9/30058
See application file for complete search history.

(56) References Cited

U.S. PATENT DOCUMENTS

| | | | |
|---|---|---|---|
| 6,006,317 A | 12/1999 | Ramagopal et al. | |
| 6,694,425 B1 | 2/2004 | Eickemeyer | |
| 10,846,097 B2 | 11/2020 | Jumani et al. | |
| 2004/0255104 A1 | 12/2004 | Akkary et al. | |
| 2005/0138480 A1 | 6/2005 | Srinivasan et al. | |
| 2016/0092230 A1* | 3/2016 | Chen | G06F 9/30065 712/241 |
| 2016/0350116 A1 | 12/2016 | Reddy et al. | |
| 2017/0010820 A1* | 1/2017 | Day | G06F 9/3851 |
| 2020/0050459 A1* | 2/2020 | Palivela | G06F 9/3848 |
| 2020/0174794 A1* | 6/2020 | Golla | G06F 9/3861 |
| 2021/0081575 A1* | 3/2021 | Saileshwar | G06F 21/556 |
| 2021/0124586 A1* | 4/2021 | Bouzguarrou | G06F 9/30145 |
| 2021/0240476 A1* | 8/2021 | Kountanis | G06F 9/30061 |
| 2022/0197650 A1* | 6/2022 | Soundararajan | G06F 9/3842 |

OTHER PUBLICATIONS

U.S. Appl. No. 18/312,052, filed May 4, 2023, Shulyak et al.
Akkary, H. et al. "Recycling Waste: Exploiting Wrong-Path Execution to Improve Branch Prediction" ICS'03, Jun. 23-26, 2003, pp. 12-21 (10 pages).

(Continued)

*Primary Examiner* — Michael J Metzger
(74) *Attorney, Agent, or Firm* — NIXON & VANDERHYE P.C.

(57) ABSTRACT

There is provided a data processing apparatus comprising history storage circuitry that stores sets of behaviours of helper instructions for a control flow instruction. Pointer storage circuitry stores pointers, each associated with one of the sets. The behaviours in the one of the sets are indexed according to one of the pointers associated with that one of the sets. Increment circuitry increments at least some of the pointers in response to an increment event and prediction circuitry determines a predicted behaviour of the control flow instruction using one of the sets of behaviours.

15 Claims, 8 Drawing Sheets

```
for (i=0; i < N; i++){
    for (j=0; j < N; j++){     // Loop iteration count hard to predict
        ...
    }
}
if (hard_to_predict){           // Branch A
    ...
}
```

(56) References Cited

OTHER PUBLICATIONS

Mutlu, O. et al. "On Reusing the Results of Pre-Executed Instructions in a Runahead Execution Processor" IEEE Computer Architecture Letters, 2005, vol. 4 (4 pages).
U.S. Appl. No. 18/454,158, filed Aug. 23, 2023, Bouzguarrou et al.
U.S. Appl. No. 18/454,165, filed Aug. 23, 2023, Bouzguarrou et al.
U.S. Appl. No. 18/462,742, filed Sep. 7, 2023, Bouzguarrou et al.

* cited by examiner

```
for (i = 0; i < N; i++){
        if (hard_to_predict){          // Branch A
                if (data[i]){          // Branch B
                        ...
                }
        }
}
```

FIG. 2

```
if (long_latency_hard_to_predict){
        ...
} if (short_latency_hard_to_predict){
        ....
}
```

FIG. 3

```
for (i=0; i < N; i++){
        if (long_latency_hard_to_predict){      // Branch A
                ...
        } if (short_latency_hard_to_predict){     // Branch B
                ...
        }
}
```

FIG. 4A short[i=0] = T      long[i=0] = T
short[i=1] = T      long[i=1] = N*
short[i=2] = N      long[i=2] = ?
short[i=3] = T      long[i=3] = ?

FIG. 4B

```
for (i=0; i < N; i++){
        for (j=0; j < N; j++){    // Loop iteration count hard to predict
                ...
        }
}
if (hard_to_predict){             // Branch A
        ...
}
```

FIG. 5

CONTROL FLOW PREDICTION USING POINTERS

TECHNICAL FIELD

The present disclosure relates to data processing and control flow prediction.

DESCRIPTION

In a data processing system, instructions can be executed speculatively. For example, conditional control flow path altering instructions determine which sequence of later instructions (control flow path) will subsequently be executed. A particular example of a conditional control flow path altering instruction is a conditional branch instruction. In such systems, execution of a conditional control flow path altering instruction can involve predicting the conditional control flow path altering instruction's outcome before the instruction has been executed. This allows the data processing system to speculatively execute later instructions on the control flow path indicated by the predicted outcome of the control flow path altering instruction. Speculative execution of instructions in this way allows the later instructions to be executed sooner than would be possible if the data processing system was forced to wait until the outcome of the earlier instruction was known, which may improve the performance of the data processing system. If the prediction of the condition of conditional control flow path altering instruction is later determined to have been incorrect, the later instructions executed from the incorrect control flow path are flushed from the pipeline of the data processing system, with the data processing system then executing instructions on the correct control flow path.

SUMMARY

Viewed from a first example configuration, there is provided a data processing apparatus comprising: history storage circuitry configured to store a plurality of sets of behaviours of helper instructions for a control flow instruction; pointer storage circuitry configured to store a plurality of pointers, each associated with one of the sets, wherein the behaviours in the one of the sets are indexed according to one of the pointers associated with that one of the sets; increment circuitry configured to increment at least some of the pointers in response to an increment event; and prediction circuitry configured to determine a predicted behaviour of the control flow instruction using one of the sets of behaviours.

Viewed from a second example configuration, there is provided a data processing method comprising: storing a plurality of sets of behaviours of helper instructions for a control flow instruction; storing a plurality of pointers, each associated with one of the sets, wherein the behaviours in the one of the sets are indexed according to one of the pointers associated with that one of the sets; incrementing at least some of the pointers in response to an increment event; and determining a predicted behaviour of the control flow instruction using one of the sets of behaviours.

Viewed from a third example configuration, there is provided a non-transitory computer-readable medium to store computer-readable code for fabrication of a data processing apparatus comprising: history storage circuitry configured to store a plurality of sets of behaviours of helper instructions for a control flow instruction; pointer storage circuitry configured to store a plurality of pointers, each associated with one of the sets, wherein the behaviours in the one of the sets are indexed according to one of the pointers associated with that one of the sets; increment circuitry configured to increment at least some of the pointers in response to an increment event; and prediction circuitry configured to determine a predicted behaviour of the control flow instruction using one of the sets of behaviours.

BRIEF DESCRIPTION OF THE DRAWINGS

The present invention will be described further, by way of example only, with reference to embodiments thereof as illustrated in the accompanying drawings, in which:

FIG. 2 illustrates an example of a guard instruction;

FIG. 3 illustrates an example of hard to predict instructions having different latencies;

FIG. 4 is made up of FIGS. 4A and 4B. FIG. 4A shows an example in which a FOR loop contains a long latency branch instruction and a short latency branch instruction. FIG. 4B shows the corresponding storage that can be used to perform replay prediction.

FIG. 5 shows how FOR loop indexing can be polluted;

DESCRIPTION OF EXAMPLE EMBODIMENTS

Figure 1:
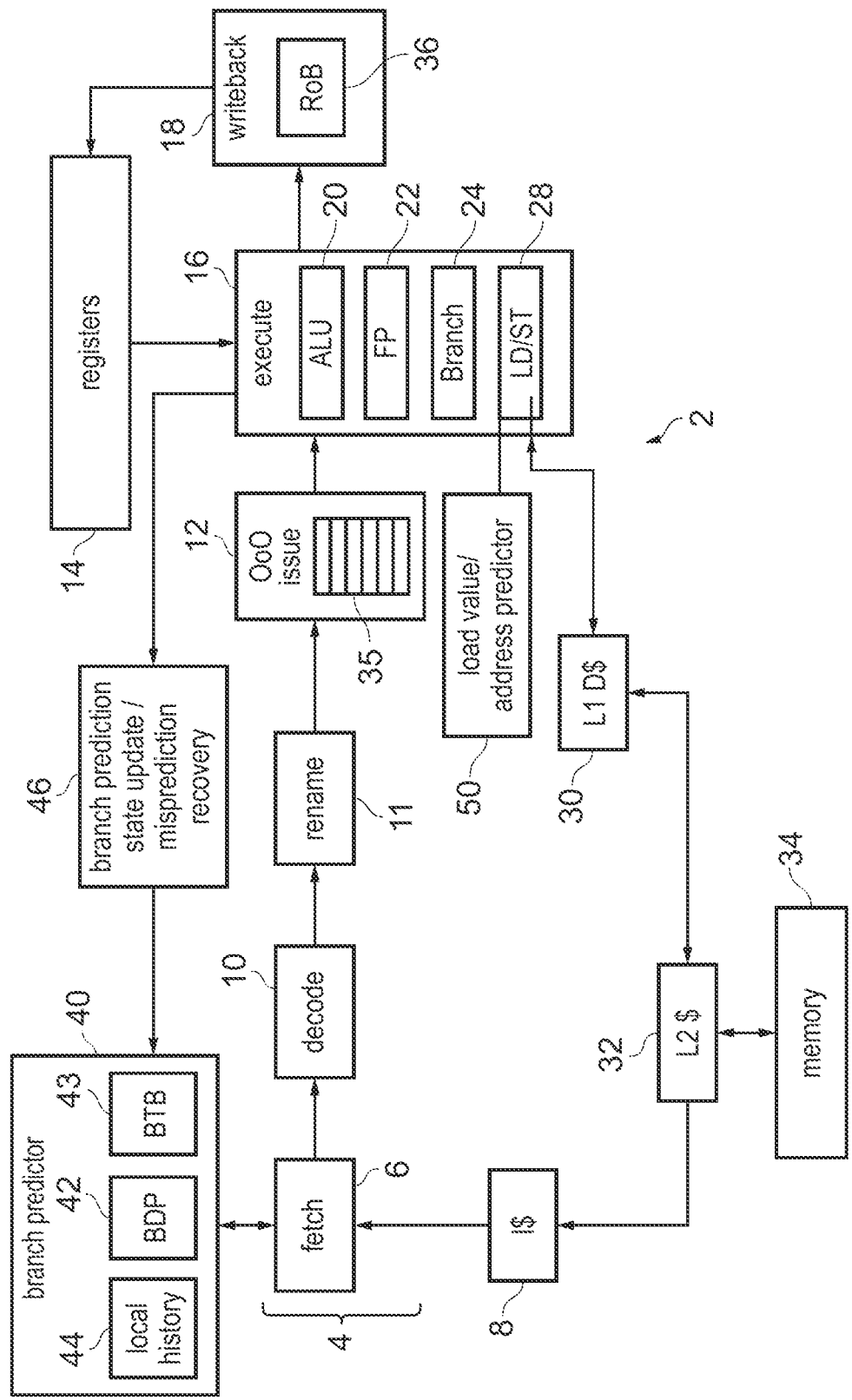
FIG. 1 schematically illustrates an example of a data processing apparatus.

Rather than using global history for control flow (e.g. branch) instruction prediction, one could consider the history of other recently executed branch instructions. This, however, can be problematic in the face of out-of-order execution in which a later branch prediction is rewound due to an earlier branch instruction being mispredicted. In this case, the series of branch outcomes taken to get to the later branch prediction instruction will be different in each case and so the previous execution of the later branch instruction does not help.

Replay prediction makes it possible to use the previous execution result (behaviour) of a branch instruction that was rewound due to a misprediction of an earlier instruction. This is particularly useful in the case of program loops (such as FOR loops) where an iteration of the FOR loop might be repeated due to rewinding. In this case, if the previous execution result of a branch instruction is kept, this result could serve as a reasonable prediction of the branch instruction's behaviour when the same iteration number is re-reached. However, it remains difficult to tell, at a hardware level, which iteration is a loop is in. This is because, at the instruction level, all that is seen are branch instructions, which might be branches or loops. Further complicating this is the fact that certain program structures can make it difficult to count the loop iteration number. It would therefore be desirable to enable replay prediction to occur accurately.

Before discussing the embodiments with reference to the accompanying figures, the following description of embodiments is provided.

In one example, there is a data processing apparatus comprising: history storage circuitry configured to store a plurality of sets of behaviours of helper instructions for a control flow instruction; pointer storage circuitry configured to store a plurality of pointers, each associated with one of the sets, wherein the behaviours in the one of the sets are indexed according to one of the pointers associated with that one of the sets; increment circuitry configured to increment at least some of the pointers in response to an increment event; and prediction circuitry configured to determine a predicted behaviour of the control flow instruction using one of the sets of behaviours.

In these examples, the history storage circuitry is used to store sets of behaviours (e.g. outcomes) of helper instructions. The helper instructions are instructions whose behaviours are used to help form a particular prediction. For a given control flow instruction (for which a prediction is to be made), several such sets of behaviours are stored. The behaviours themselves are indexed using a pointer—one for each set. That is, the pointer indicates where (at what index) the next behaviour should be stored within the set. The indexing of behaviours may therefore differ. The pointers increment in response to increment events (which might differ for each pointer). It is anticipated that one of the pointers will increment at the same rate at which any encapsulating loop iterates. Future predictions can then be made based on the behaviours indexed by that pointer without the need to detect FOR loops that perform pollution, guard branches, merge points, and so on that make it possible to syntactically understand which branch instructions contribute to the index of the FOR loop. In some examples, a further behaviour that is tracked is the most recent prediction made for the particular control flow instruction.

In some examples, the data processing apparatus comprises: flush circuitry configured to generate a flush in response to a control flow misprediction; and the flush circuitry is configured to maintain contents of the history storage circuitry during the flush. When a control flow misprediction occurs (e.g. when the result of the condition on which a branch is predicated turns out to be other than what was predicted), a rewind occurs by flushing the pipeline to the point of the conditional control flow altering instruction. In these examples, the contents of the history storage circuitry is maintained. For instance, the behaviour associated with control flow instructions that executed remains stored for a future replay prediction to occur. Consequently, the processing associated with difficult to predict instructions is not lost or wasted.

In some examples, the data processing apparatus comprises: recover circuitry configured to recover a previous value of the plurality of pointers in response to the flush. The pointer values are therefore reset to a point of the misprediction thereby allowing the behavioural sets to be indexed into, in order to perform replay predictions.

In some examples, each of the sets of behaviours in the plurality of sets of behaviours is different. For instance, in some examples, the behaviours that are recorded in the sets are the same but the behaviours are stored at different indexes within each set. If the behaviour relates to three branch instructions all having been taken (T) then one set might correspond with {0:T, 1:T, 2:T} to indicate that at indexes 0, 1, and 2, the branch instruction was taken. Another set might correspond with {0:T, 2:T, 3:T} to indicate that at indexes 0, 2, and 3, the same three branch instructions were taken. This leaves open the question as to what the prediction is at index 1 of the loop. This value could be stored as 'unknown' or could be set to a default value (e.g. "Not taken"—N). The former requires additional storage space than the latter.

In some examples, the increment circuitry is configured to increment each of the pointers at a different rate. For instance, some of the increment events may not apply to some of the pointers or different types of increment events might affect some pointers but not others.

In some examples, the increment event is a backwards taken branch. A backwards taken branch can be considered to be a any instruction that causes the program counter value to decrease (or remain the same). That is, instructions for which the control flow goes backwards through the system. In the case of a FOR loop, this typically corresponds with the end of the body of the FOR loop as the program returns back to the test-and-iterate part of the FOR loop. The pointers may be global. In other words, the pointers may never reset to zero and may instead increment from startup.

In some examples, the increment circuitry is configured to increment only some of the pointers in response to the increment event; and the increment event is configured to increment a plurality of the pointers. Therefore, although not every increment event causes every pointer to increment, there are at some increment events that cause multiple pointers to increment. As previously discussed, the pointers might increment at different rates meaning that some increment events might increment all pointers, other increment events might increment a subset of pointers and other increment events might only increment a single pointer. In theory, one or more of the pointers might be expected to increment together with iterations of the encompassing FOR loop.

In some examples, the increment circuitry is configured to determine which of the pointers to increment based on a program counter value of the backwards taken branch. The program counter value of the backwards taken branch therefore indicates which set of pointers are incremented.

In some examples, the increment circuitry is configured to determine which of the pointers to increment based on a hash of the program counter value of the backwards taken branch. For instance, one might consider the least significant n bits of the program counter value of the backwards taken branch instruction. The least significant n bits thereby indicate which of the $\log_2(n)$ pointers should be incremented. For instance, if the least significant bits are 14 (1110 in binary) then this might cause pointers 4, 3, and 2 to be incremented, but not pointer 1. In some examples, regardless of the number of pointers, one pointer is incremented for all backwards taken branch instructions. In some examples, each pointer comes in a pair (of which there are $\log_2(n)$ pairs of pointers) and exactly one pointer in each pair is incremented. Taking the above example, as well as updating pointers 4, 3, and 2, pointer 1' would also be updated. However pointers 4', 3', 2' and 1 would not be updated.

In some examples, the data processing apparatus comprises: training circuitry configured to maintain a plurality of confidence values for each of the sets of behaviours of helper instructions. As previously described, it is anticipated that one of the pointers will increment as the FOR loop iterates. In an ideal case, that pointer only increments as the FOR loop iterates by virtue of only being incremented by the backwards taken branch of the FOR loop itself. The behaviours of the helper instructions (e.g. the control flow instruction at each iteration) is therefore indexed in correlation with the FOR loop. During a training period, for each set of behaviours, a confidence score is kept that indicates whether using those behaviours to form the basis of a prediction for the control flow instruction tends to lead to a correct prediction or not. E.g. when an iteration x is reached, does the result of the previous execution of the branch instruction at iteration x correspond with the result of the current execution of the branch instruction at iteration x? Once the training period is complete, one of the sets of behaviours is used for future predictions of that control flow instruction.

In some examples, the one of the sets of behaviours used to determine the predicted behaviour of the control flow instruction has a highest confidence value among the confidence values. That is, once the training period has completed, the confidence scores are assessed. The set of behaviours having the highest confidence score is used to form predictions going forward. In practice, of course, the set of behaviours that is selected corresponds with one of the pointers and it is that pointer which is used to continue indexing the behaviour of future executions of the helper instructions in order to form further predictions once the training period has ended. In some embodiments, training is restarted periodically. In other embodiments, training is a continual process.

In some examples, the helper instructions are previous instances of the control flow instruction. In these examples, the previous behaviour of the control flow instruction itself at a particular iteration is used as a prediction of the same iteration of the same control flow instruction (which will occur when a misprediction causes a rewind).

Note that within this description, the term 'pointer' is used in respect of the indexing. It will be appreciated that this encompasses the idea of a memory pointer, as well as a counter that can be used to indicate a particular location within a set relative to other entries of that set. E.g. if a counter value of 19918 is present, then by storing the counter value associated with an index 0 (e.g. 19911) it is possible to determine that the current counter value points to entry index (19918-19911=7).

Particular embodiments will now be described with reference to the figures.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (ROB) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50.

It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example, the load value prediction may record previously seen values loaded from a particular address, and may predict that on subsequent instances of loading from that address the value is expected to be the same. Also, the load address predictor may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. In the present techniques, one of the prediction techniques that is used is a replay predictor in which the previous execution of an instruction that is subsequently rewound can be used as a basis for predicting the outcome of its re-execution.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively, if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address.

One solution to this is to select predictions based on history information which tracks a sequence of previously seen instruction behaviour. Global history can be used as the branch history format. In particular, a sequence of taken and not taken outcomes for a series of branches can be tracked. The outcome of other branch instructions can then be correlated with the current branch history over time, in order to enable future predictions to be made.

A downside to this approach is that the same global history might be seen for multiple branch instructions. For instance, the sequence NNTTTNNT (assuming a global history of 8 branch instructions is considered) might be encountered for two branch instructions at completely different addresses. In this situation, it is unlikely that there would be any correlation between the outcome of the two distant branch instructions even though the global history technically matches.

Another possibility might be to use local history, which involves correlating the outcome of a branch instruction to the global history seen at that branch instruction (i.e., the history local to that branch instruction). This solution can work well. However, it can require maintaining a large amount of data for each branch instruction. For instance, since each branch instruction might be encountered with different frequencies and along different paths, it may be necessary to track the history multiple times—once for each branch instruction. A further difficulty with using local history is that in many cases, the local history might not be relevant. For instance, consider the situation illustrated in FIG. 2. Here, branch A acts as a guard for branch B. In other words, branch B is only encountered dependent on the outcome of branch A. The outcome of branch A forms part of the local history of branch B. However, this information is irrelevant because the entry in the local history for branch A will always be the same value.

Separately to this, it is also desirable to enable replay prediction. In a speculative out-of-order processor, instructions can be executed in an order other than how they appear in the program itself in order to improve overall efficiency of execution. In such situations, some later branch instructions might resolve while the result of an earlier branch instruction is waiting for resolution. For instance, in the example of FIG. 3, the short latency hard to predict condition might be expected to resolve before the long latency hard to predict condition is resolved. Under normal circumstances, if the long latency instruction was mispredicted then a 'rewind' occurs that causes the program to revert to the state that it was in at the time the long latency instruction was executed. This is done in order to prevent the wrong execution path being taken. However, as a consequence of this, the prediction and outcome data generated for the short latency instruction is lost. In practice, however, since execution of the short latency instruction is not dependent on the long latency instruction, the previous execution of that instruction is likely to be a very good guide as to how the instruction will execute when it is reexecuted. Hence, it would be beneficial for the result of executing the short latency instruction to be kept (despite the rewind) in order to be available for a future 'replay prediction'. Note, however, that history-based predictors may not be able to help with such replays. This is because the history taken to get to the short latency instruction will be different between the two executions due to the misprediction. In particular, the long latency instruction is taken in one execution and not taken in the other. With differing history information, it is difficult if not impossible to form a prediction of the short latency instruction.

The inventors of the present invention have realised that it is possible to index previous behaviours of a branch instruction according to indexes of FOR loops within the program. Each instance of a given instruction can therefore be individually recognised (a branch instruction that occurs outside a FOR loop simply has an index of 0). If the same iteration/index is encountered again in the future (e.g. due to a replay that occurs after a rewind due to a misprediction event) then the previous behaviour of that branch instruction for that iteration/index can be used as the prediction for the direction in which the branch instruction will go.

An example of this is illustrated in FIGS. 4A and 4B. FIG. 4A shows an example in which a FOR loop contains a long latency branch instruction and a short latency branch instruction. In this example, it is assumed that a misprediction occurs with the second iteration (i=1) of the long latency instruction. That is to say that a prediction is made for one direction and on resolution it is determined that the prediction was incorrect. However, because the long latency instruction is followed by a short latency instruction and because these can be performed out of order, the situation arises in which several further executions of later iterations of the short latency instruction are made before the second iteration of the long latency instruction is resolved thereby revealing the misprediction and resulting in a rewind. In these situations, it would be desirable to store the results of those executions to form the basis of future predictions.

FIG. 4B shows the storage of the data. As described earlier, the indexing is carried out based on the index of the FOR loop. Due to the difference in latencies, more (4) executions of the short latency instruction are made as compared to the long latency instruction (2). When the rewind occurs, the program returns to the second iteration (i=1) of the loop and the long latency instruction is taken (rather than not taken, which was the incorrect prediction). However, the executions performed for the third and fourth iterations (i=3 and i=4) of the short latency instruction remain stored. Then, when the third and fourth iterations are reached for the second time, the previous executions of those iterations can form the basis of predictions for the short latency branch instruction.

A difficulty with this approach is aligning the indexing of the branch behaviour with the index of the FOR loop. In particular, at the time of instruction execution there may be nothing to distinguish a FOR loop from any other branch instruction. Even then, it may not be immediately obvious how to determine which variable (e.g., which value in which register) is used as the index for the FOR loop. One approach to solving this problem is to count backwards taken branches (i.e., instructions where the value of the program counter has decreased as compared to its previous value) and to use this as the index. A loop such as a FOR loop will contain a backwards taken branch at the end of the main body. By keeping a running count of such branches through execution of the program, it is possible to unique identify each instance of each instruction.

However, even this approach is not without difficulty. In particular, such a pointer can become polluted. For example, consider the situation shown in FIG. 5. Here, an outer FOR loop is present, which contains an inner FOR loop, whose index is hard to predict. Indeed, the iteration count might always be different (or could even be random). By the time branch A is reached, the backwards taken branch pointer could point to a variety of locations. Consequently, the index at which the behaviour of branch A is stored may have no relation to the index of the outer FOR loop. This therefore makes any replay impractical since it is very difficult to determine the previous behavioural execution of branch A for a given iteration of the outer FOR loop.

The inventors of the present invention solve this problem by providing a plurality of pointers. Not every pointer is updated at every backwards taken branch instruction. In some cases, some pointers could be updated with every backwards taken branch instruction. Other pointers could be updated only every M backwards taken branch instructions. Some backwards taken branch instructions might update multiple (or even all) pointers. By maintaining a number of pointers, each of which is updated differently, it is expected that one of the pointers will be incremented in correspondence with the FOR loop index.

Figure 6:
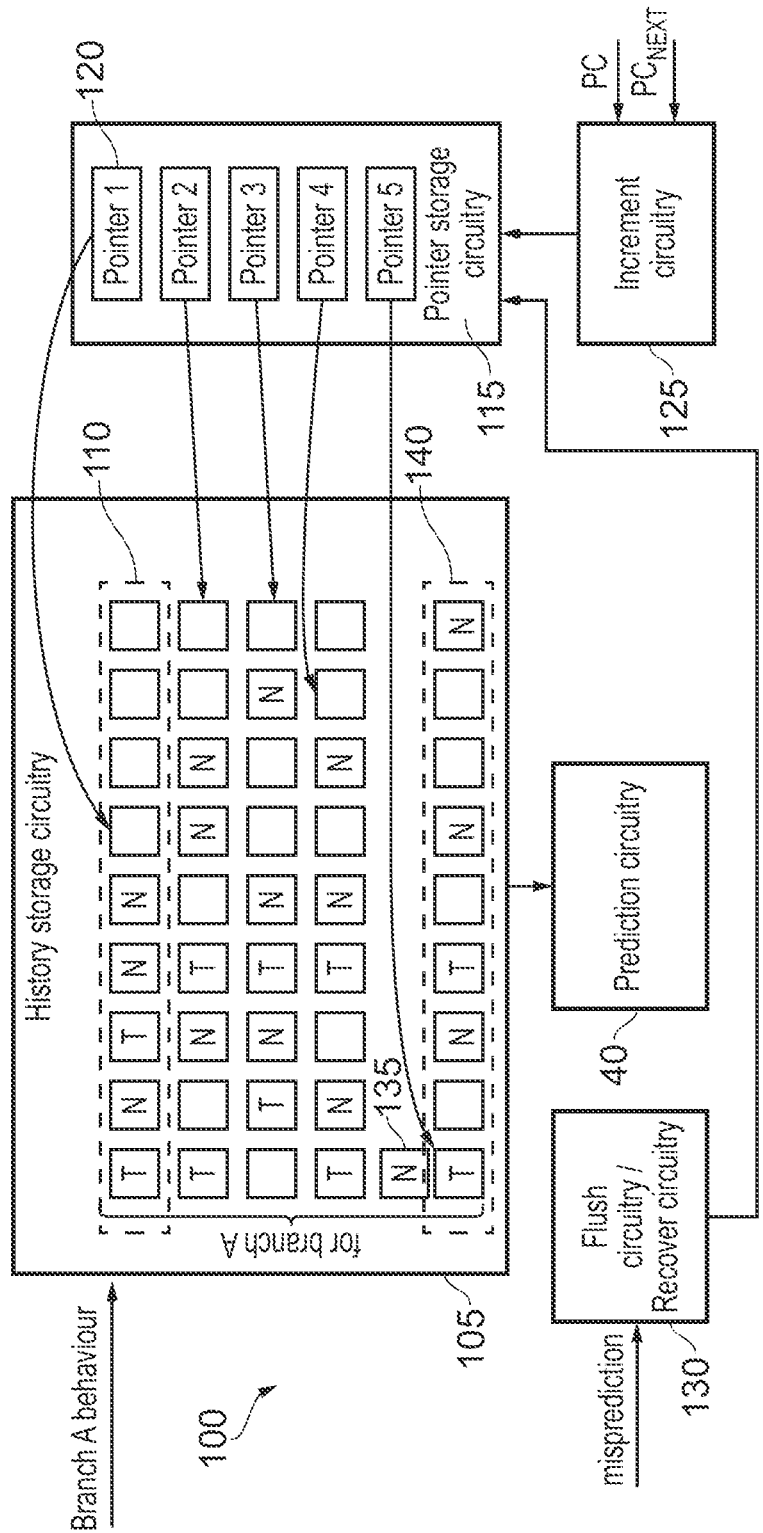
FIG. 6 schematically illustrates an example of a data processing apparatus.

FIG. 6 illustrates an example of the data processing apparatus 100 in accordance with some examples. The data processing apparatus 100 includes history storage circuitry 105. This stores six of sets 110 of behaviours of helper instructions that are usable to predict the behaviour of a control flow instruction (branch A). In this case, the helper instructions are other instances of the control flow instruction (branch A) itself, as might occur in a FOR loop for instance. It will be appreciated that multiple plurality of sets may be provided—each for a different control flow instruction. Pointer storage circuitry 115 is provided that stores a plurality of pointers 120, with each of the pointers 120 being associated with one of the sets 110 of behaviours. The pointer is used to index entries into the sets. That is, each pointer indicates where a next entry into the associated set should be stored. In this example, the actual behaviours are the same, but the set of behaviours differs due to the indexing. In this example, the behaviours are (in order) TNTNN. However, the sets differ because in some instances, there are gaps between some of the behaviours. The differences in the behaviours arise due to differences in how the pointers 120 in the pointer storage circuitry 115 are updated by the increment circuitry 125. In particular, the increment circuitry receives a current program counter value (PC) and the program counter value of a next instruction (PCNEXT). If PCNEXT is less than or equal to PC, then the current instruction is a backwards taken branch and one or more of the pointers are updated.

Two special sets 135, 140 are stored for each control flow instruction. The first of these sets 135 tracks only the most recent prediction that has been made for the control flow instruction. The second set 140 has its pointer incremented for all backwards taken control flow instructions.

Prediction circuitry 40 is provided to make a prediction of the future behaviour of the control flow instruction (e.g. branch A) based on one of the sets. It is hoped that the set that would be selected is one that corresponds with the FOR loop. A process for correctly selecting the set using a training mode is illustrated below. With one of the set having been selected, the corresponding pointer is used to index into that set. If a previous behaviour is stored then this can be used to form the basis of the prediction for the control flow instruction. Otherwise, more common prediction techniques can be used. That is, if one set 110 has been selected and if the corresponding pointer 120 currently refers to index '3' then it is determined whether the set 110 has an entry at index 3. If so, then a previous execution of the branch A at this iteration has occurred and the behaviour (T) can be used to predict how branch A will perform again (e.g. it will be taken). If the entry is empty then no previous behaviour has been recorded for the current iteration and so no prediction is made in this way. Other prediction techniques can be used instead.

Finally in FIG. 6, flush circuitry and recover circuitry 130 (which are shown as a single device) are provided. In response to a misprediction on a control flow instruction, this causes a flush of the pipeline to occur. As part of this process, the values of the pointers 120 are reset to a value that they had at the time of the mispredicted instruction being issued. However, the contents of the history storage circuitry 105 are not touched as a consequence of the flush. That is the flush itself does not count as a backwards taken branch instruction and the behaviours of the instructions that follow the mispredicted instruction are not erased from the history storage circuitry 105 and thus can be used to form the basis of a later prediction.

Figure 7:
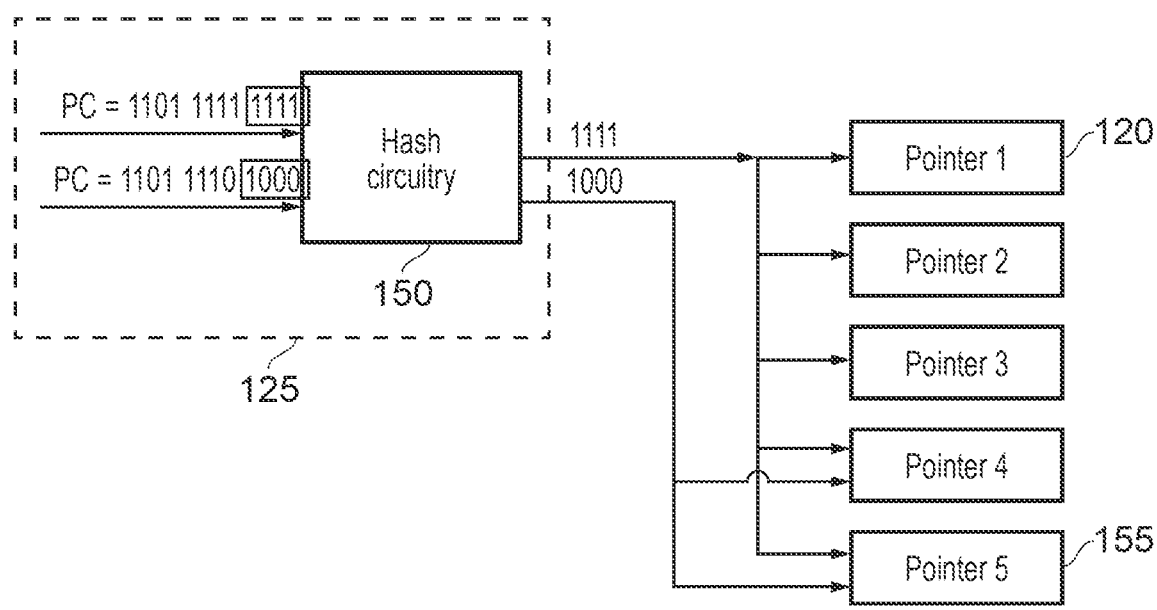
FIG. 7 illustrates how the selection of which pointers to update can take place when a backwards taken branch is encountered.

FIG. 7 illustrates how the selection of which pointers to update can take place when a backwards taken branch is encountered. In FIG. 7, hash circuitry 150, which forms part of the increment circuitry 125 is provided. Here, a hash of the program counter value (PC) is made, e.g. by considering a number of least significant bits equal to the number of different sets of behaviours that are tracked. In the example of FIG. 6, six sets of behaviours are shown. One 135 of these only considers the most recent prediction for the control flow instruction while another 140 has its pointer incremented for every backwards taken branch. Therefore, the least significant four bits may be considered. The resulting bitfield then indicates which pointers should be incremented. For instance, if the resulting bitfield is 1111 then all four pointers are updated, together with the pointer 155 that is updated for every backwards taken branch. If the resulting bitfield is 1000 then only the fourth set and the fifth set are updated (the fifth set always being updated).

Figure 8:
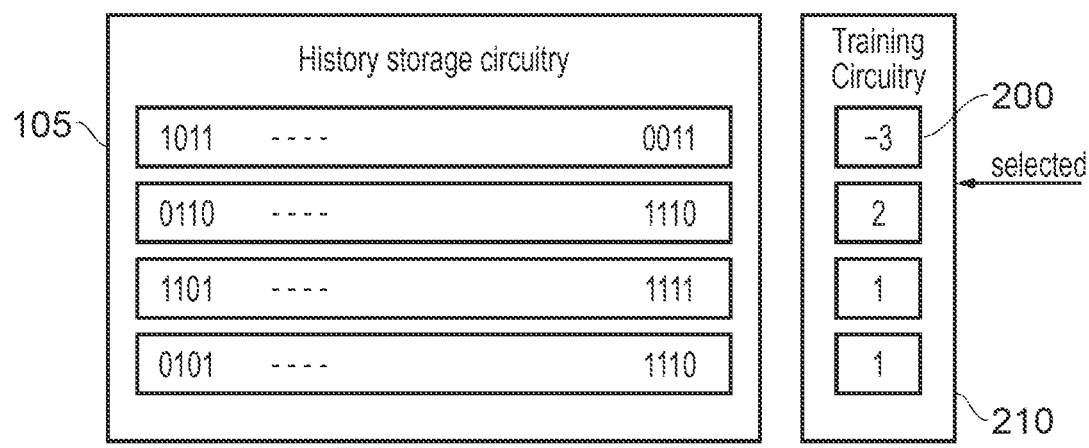
FIG. 8 illustrates the training circuitry, which is used to perform the training process.

FIG. 8 illustrates the training circuitry 210, which is used to perform the training process. In this example, the history storage circuitry is made up of a number of 64-bit vectors that store 64 previous behaviours—e.g. using 0 as not taken and 1 as taken and with blanks/unknowns having a default value of 0. In practice, it remains expensive to continually store a plurality of sets of behaviours for each control flow instruction. However, after a period of time (the training period) it should be possible to determine which pointer value/increment strategy leads to the storing of the set of behaviours from which correct predictions can be made. Thereafter it is only necessary to store the set of behaviours corresponding to that selected pointer/increment strategy. One way to achieve this is to store, in training circuitry 210, a set of confidence values 200—one for each of the six sets of behaviours that are stored. During the training period, any of the behaviours can be used to make a prediction. If the prediction is correct then the confidence value is incremented. If the prediction is incorrect or cannot be made then the confidence value is decreased. After a period of training has elapsed, the behaviour having the highest confidence value is selected. The corresponding pointer is maintained while other pointers are no longer updated and the behavioural sets that are associated with those pointers are reused (e.g., for training other branch instructions).

Figure 9:
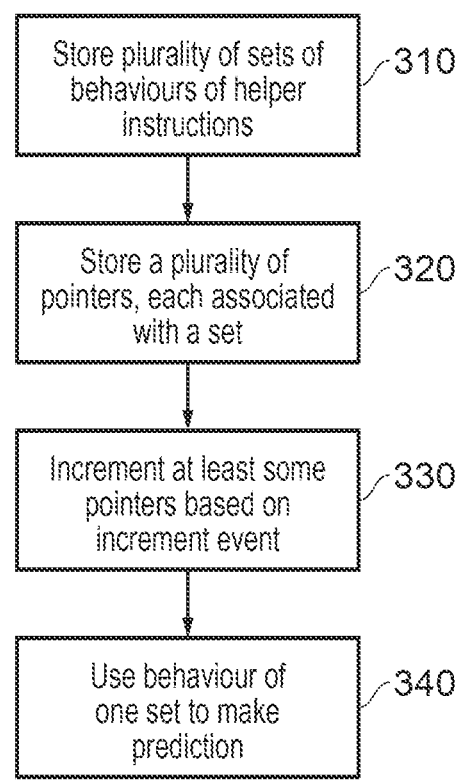
FIG. 9 illustrates an example of a data processing method.

FIG. 9 illustrates an example of a data processing method in accordance with some examples. At a step 310, for a particular control flow instruction (branch instruction) a plurality of sets of behaviours are stored. The actual behaviours within the sets may be the same, but indexed differently. At a step 320, a plurality of pointers is stored. Each of the pointers is associated with one of the sets of behaviours and indicates where a next behaviour is to be stored within that set. At a step 330, at least some of the pointers are incremented in response to an increment event like the occurrence of a backwards taken branch. Because not all events update all pointers, the pointers will differ from each other at different times and hence the indexing of the behaviours within each set will be different. Finally, at a step 340, one set of behaviours is used to form a prediction. This is done by examining the index of the set that the pointer for that set currently refers to. The resulting value then corresponds with the predicted behaviour for the control flow instruction.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
   history storage circuitry configured to store a plurality of sets of behaviours of helper instructions for a control flow instruction;
   pointer storage circuitry configured to store a plurality of pointers, each associated with one of the sets, wherein the behaviours in the one of the sets are indexed according to one of the pointers associated with that one of the sets;
   increment circuitry configured to increment at least some of the pointers in response to an increment event; and
   prediction circuitry configured to determine a predicted behaviour of the control flow instruction using one of the sets of behaviours.
2. The data processing apparatus according to any preceding clause, comprising:
   flush circuitry configured to generate a flush in response to a control flow misprediction; and
   the flush circuitry is configured to maintain contents of the history storage circuitry during the flush.
3. The data processing apparatus according to clause 2, comprising:
   recover circuitry configured to recover a previous value of the plurality of pointers in response to the flush.
4. The data processing apparatus according to any preceding clause, wherein
   each of the sets of behaviours in the plurality of sets of behaviours is different.
5. The data processing apparatus according to any preceding clause, wherein
   the increment circuitry is configured to increment each of the pointers at a different rate.
6. The data processing apparatus according to any preceding clause, wherein
   the increment event is a backwards taken branch.
7. The data processing apparatus according to any preceding clause, wherein
   the increment circuitry is configured to increment only some of the pointers in response to the increment event; and
   the increment event is configured to increment a plurality of the pointers.
8. The data processing apparatus according to any one of clauses 6-7, wherein
   the increment circuitry is configured to determine which of the pointers to increment based on a program counter value of the backwards taken branch.
9. The data processing apparatus according to any one of clauses 6-8, wherein the increment circuitry is configured to determine which of the pointers to increment based on a hash of the program counter value of the backwards taken branch.
10. The data processing apparatus according to any preceding clause, comprising:

training circuitry configured to maintain a plurality of confidence values for each of the sets of behaviours of helper instructions.

11. The data processing apparatus according to clause 10, wherein
the one of the sets of behaviours used to determine the predicted behaviour of the control flow instruction has a highest confidence value among the confidence values.

12. The data processing apparatus according to any preceding clause, wherein
the helper instructions are previous instances of the control flow instruction.

13. The data processing apparatus according to any preceding clause, wherein
the helper instructions are previous instances of the control flow instruction in a loop.

14. A data processing method comprising:
storing a plurality of sets of behaviours of helper instructions for a control flow instruction;
storing a plurality of pointers, each associated with one of the sets, wherein the behaviours in the one of the sets are indexed according to one of the pointers associated with that one of the sets;
incrementing at least some of the pointers in response to an increment event; and
determining a predicted behaviour of the control flow instruction using one of the sets of behaviours.

15. A non-transitory computer-readable medium to store computer-readable code for fabrication of a data processing apparatus comprising:
history storage circuitry configured to store a plurality of sets of behaviours of helper instructions for a control flow instruction;
pointer storage circuitry configured to store a plurality of pointers, each associated with one of the sets, wherein the behaviours in the one of the sets are indexed according to one of the pointers associated with that one of the sets;
increment circuitry configured to increment at least some of the pointers in response to an increment event; and
prediction circuitry configured to determine a predicted behaviour of the control flow instruction using one of the sets of behaviours.

We claim:

1. A data processing apparatus comprising:
history storage circuitry configured to store a plurality of sets of behaviours of helper instructions for a control flow instruction;
pointer storage circuitry configured to store a plurality of pointers, each associated with one of the sets, wherein the behaviours in the one of the sets are indexed according to one of the pointers associated with that one of the sets;
increment circuitry configured to increment at least some of the pointers in response to an increment event; and
prediction circuitry configured to determine a predicted behaviour of the control flow instruction using one of the sets of behaviours.

2. The data processing apparatus according to claim 1, comprising:
flush circuitry configured to generate a flush in response to a control flow misprediction; and
the flush circuitry is configured to maintain contents of the history storage circuitry during the flush.

3. The data processing apparatus according to claim 2, comprising:
recover circuitry configured to recover a previous value of the plurality of pointers in response to the flush.

4. The data processing apparatus according to claim 1, wherein
each of the sets of behaviours in the plurality of sets of behaviours is different.

5. The data processing apparatus according to claim 1, wherein
the increment circuitry is configured to increment each of the pointers at a different rate.

6. The data processing apparatus according to claim 1, wherein
the increment event is a backwards taken branch.

7. The data processing apparatus according to claim 1, wherein
the increment circuitry is configured to increment only some of the pointers in response to the increment event; and
the increment event is configured to increment a plurality of the pointers.

8. The data processing apparatus according to claim 6, wherein
the increment circuitry is configured to determine which of the pointers to increment based on a program counter value of the backwards taken branch.

9. The data processing apparatus according to claim 6, wherein
the increment circuitry is configured to determine which of the pointers to increment based on a hash of the program counter value of the backwards taken branch.

10. The data processing apparatus according to claim 1, comprising:
training circuitry configured to maintain a plurality of confidence values for each of the sets of behaviours of helper instructions.

11. The data processing apparatus according to claim 10, wherein
the one of the sets of behaviours used to determine the predicted behaviour of the control flow instruction has a highest confidence value among the confidence values.

12. The data processing apparatus according to claim 1, wherein
the helper instructions are previous instances of the control flow instruction.

13. The data processing apparatus according to claim 1, wherein
the helper instructions are previous instances of the control flow instruction in a loop.

14. A data processing method comprising:
storing a plurality of sets of behaviours of helper instructions for a control flow instruction;
storing a plurality of pointers, each associated with one of the sets, wherein the behaviours in the one of the sets are indexed according to one of the pointers associated with that one of the sets;
incrementing at least some of the pointers in response to an increment event; and
determining a predicted behaviour of the control flow instruction using one of the sets of behaviours.

15. A non-transitory computer-readable medium to store computer-readable code for fabrication of a data processing apparatus comprising:

history storage circuitry configured to store a plurality of sets of behaviours of helper instructions for a control flow instruction;

pointer storage circuitry configured to store a plurality of pointers, each associated with one of the sets, wherein the behaviours in the one of the sets are indexed according to one of the pointers associated with that one of the sets;

increment circuitry configured to increment at least some of the pointers in response to an increment event; and prediction circuitry configured to determine a predicted behaviour of the control flow instruction using one of the sets of behaviours.

* * * * *